United States Patent [19]

Taromaru

[11] Patent Number: 5,548,836
[45] Date of Patent: Aug. 20, 1996

[54] DIVERSITY RECEIVER

[75] Inventor: Makoto Taromaru, Fukuoka-ken, Japan

[73] Assignee: Matsushita Electric Industrial Co., Ltd., Osaka, Japan

[21] Appl. No.: 265,214

[22] Filed: Jun. 24, 1994

[30] Foreign Application Priority Data

Jul. 27, 1993 [JP] Japan .................. 5-184926

[51] Int. Cl.$^6$ ................................. H04B 7/08
[52] U.S. Cl. .................. 455/277.1; 455/277.2; 455/278.1; 455/272
[58] Field of Search .................. 455/277.1, 277.2, 455/278.1, 134, 135, 137, 133, 63, 65, 272, 275, 279.1

[56] References Cited

U.S. PATENT DOCUMENTS

| 4,756,023 | 7/1988 | Kojima .................. 445/134 |
| 5,129,098 | 7/1992 | McGirr et al. .................. 455/127 |
| 5,379,449 | 1/1995 | Porambo .................. 455/277.2 |
| 5,396,645 | 3/1995 | Huff .................. 455/134 |

FOREIGN PATENT DOCUMENTS

| 57-10542A | 1/1982 | Japan . |
| 62-47222A | 2/1987 | Japan . |
| 404088727 | 3/1992 | Japan .................. 455/65 |

Primary Examiner—Reinhard J. Eisenzopf
Assistant Examiner—Thanh Le
Attorney, Agent, or Firm—Watson Cole Stevens Davis, P.L.L.C.

[57] ABSTRACT

In a diversity receiver, an averaging circuit produces a short-time average value of an instantaneous value of a receiving electric field intensity at a receiving section. A ROM produces an appropriate threshold value corresponding to the short-time average value from the averaging circuit. A threshold decision circuit compares the threshold value produced from the ROM with the instantaneous value of the receiving electric field intensity and controls an antenna switch to switch antennas when the instantaneous value decreases below the threshold value.

7 Claims, 12 Drawing Sheets

DIVERSITY RECEIVER

BACKGROUND OF THE INVENTION

1. Field of the Invention

The present invention relates to a diversity receiver used for radio communication accompanied by fading.

2. Description of the Related Art

The diversity receiver is well known as a means for alleviating the effect of fading (attenuation of the receiving electric field intensity due to the interference of two or more radio waves arriving through different routes). In recent years, the diversity receiver has been widely used for the radio equipment for the base station of mobile unit communications including especially the automobile telephone and portable telephone which cause the fading due to the movement of a local office or a remote office. The most recent application of the diversity receiver is a mobile station requiring miniaturization of the apparatus.

A most common diversity receiver comprises a plurality of antennas each having a receiving section. Such a diversity receiver is of post-detection synthesis type in which the output of each receiving section is selected or synthesized to produce a receiving output under appropriate conditions (such as a high receiving electric field intensity). The post-detection synthesis-type diversity receiver, however, requires a plurality of receiving sections and therefore is complicated in configuration. This inevitably increases the receiver size. In order to simplify the apparatus, a diversity receiver of antenna-switching type with a single receiving section and a plurality of antennas has been suggested which receives radio waves by appropriately switching the antennas under proper conditions.

Figure 1:
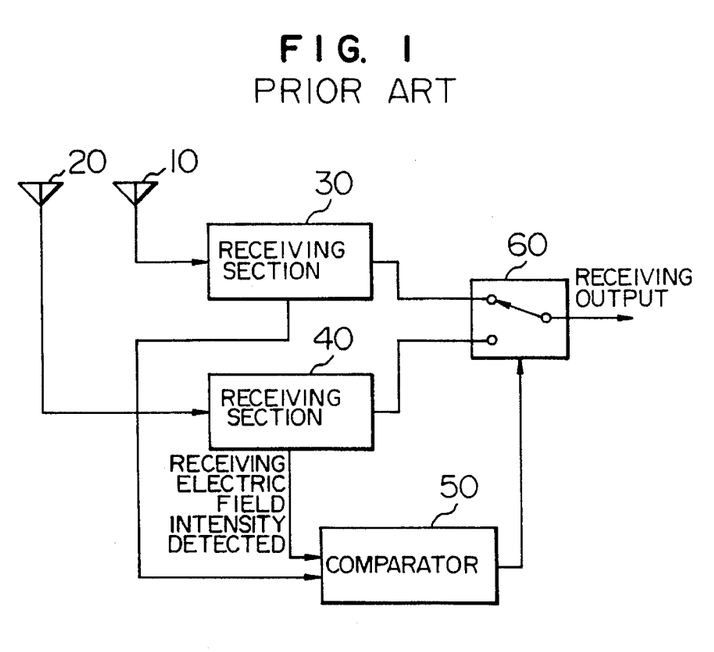
FIG. 1 is a block diagram showing a conventional diversity receiver of post-detection synthesis type.

The configuration of a first example of the conventional diversity receiver of post-detection synthesis type is shown in the block diagram of FIG. 1. In FIG. 1, reference numerals 10, 20 designate antennas, and numerals 30, 40 denote receiving sections for receiving the desired radio wave through the antennas 10, 20 respectively. These receiving sections 30, 40 are capable of detecting the instantaneous value of the receiving electric field intensity. Numeral 50 designates means for comparing the instantaneous values of the receiving electric field intensity obtained from the receiving sections 30, 40, and numeral 60 denotes means for selecting the output of the receiving sections 30 or 40 whichever is larger in the instantaneous value of the receiving electric field intensity as a demodulation output in accordance with the output of the receiving electric field intensity comparator 50.

Explanation will be made below about the operation of the first example of the conventional diversity receiver of post-detection synthesis type configured as described above.

Fading occurs with the movement of a transmitting station or a vehicle equipped with the receiver. As far as a sufficient distance is secured between the antenna 10 and the antenna 20, the correlation between the antennas 10 and 20 is smaller, and therefore the probability is high that the instantaneous values of the receiving electric field intensity at the receiving section 30 and the receiving section 40 are different.

Generally, the output of the receiving section with a higher receiving electric field intensity has lower noise and a better receiving signal. The selector 60 therefore selects the output of the larger instantaneous value of the receiving electric field intensity between the receiving sections 30, 40 based on the output of the receiving electric field intensity comparator 50.

In the first example of the conventional diversity receiver of post-detection synthesis type described above, however, a plurality of receiving sections 30, 40 are required as shown in FIG. 1, thereby leading to the problems of bulkiness and high production cost.

SUMMARY OF THE INVENTION

The diversity receiver according to a first embodiment of the present invention comprises a plurality of antennas, an antenna switch for selectively producing one of the outputs of the antennas, a receiving section having a circuit for detecting an instantaneous value of a receiving electric field intensity connected to the antenna switch, averaging means for producing a short-time average value of the instantaneous values of the receiving electric field intensity at the receiving section, a converter for producing an appropriate threshold value in accordance with the short-time average value produced from the averaging means, and a comparator for comparing the threshold value from the converter with the instantaneous value of the receiving electric field intensity and controlling the antenna switch, wherein the comparator is so configured that the antennas are switched by the antenna switch when the instantaneous value of the receiving electric field intensity decreases below the threshold value.

The converter may be comprised of a read-only memory.

In the configuration according to the first embodiment of the invention, the threshold value at the comparator changes in such a manner as to assume an appropriate value corresponding to the short-time average value of the instantaneous value of the receiving electric field intensity, thereby improving the probability of selecting the antenna with a higher receiving electric field intensity.

Figure 2:
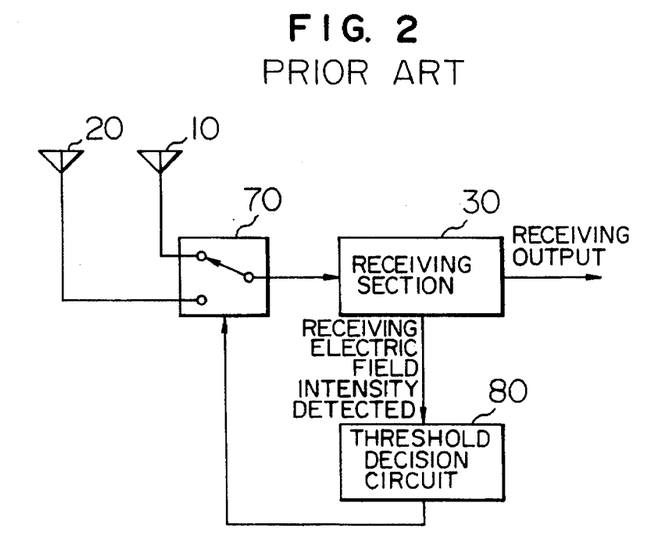
FIG. 2 is a block diagram showing a conventional diversity receiver of antenna-switching type.

Now, explanation will be made about a second example of the conventional diversity receiver of antenna-switching type. FIG. 2 is a block diagram showing the configuration of the second example of the conventional diversity receiver of antenna-switching type. In FIG. 2, numerals 10, 20 designate antennas, numeral 70 an antenna switch for selectively producing the output of the antenna 10 or the antenna 20, and numeral 30 a receiving section for receiving and demodulating the desired radio wave through the antenna 10 or 20 connected by the antenna switch 70. An instantaneous value of a receiving electric field intensity can be detected by this configuration. Numeral 80 designates a threshold decision circuit for controlling the antenna switch 70 when the instantaneous value of the receiving electric field intensity decreases below a predetermined threshold value, so that the antenna 10 or 20 which may be presently connected is switched to the antenna 20 or 10 respectively.

The operation of the second example of the conventional diversity receiver of antenna-switching type as configured above will be explained below.

Figure 3A:
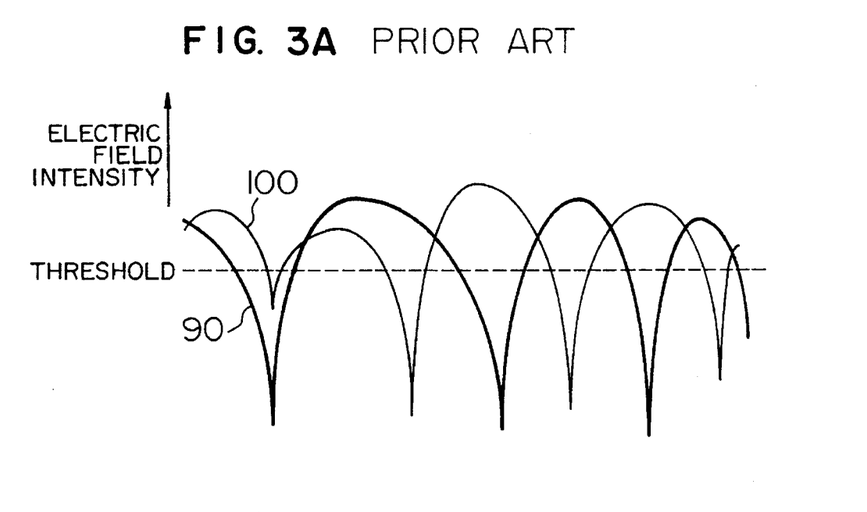
FIGS. 3A to 3C are diagrams for explaining a conventional diversity receiver of antenna-switching type.
Figure 3B:
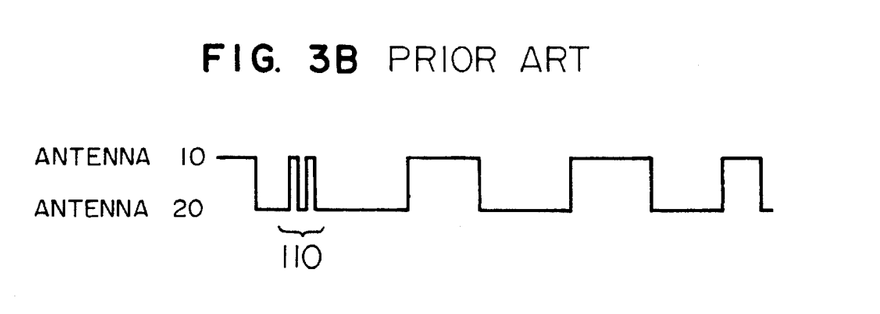
Figure 3C:
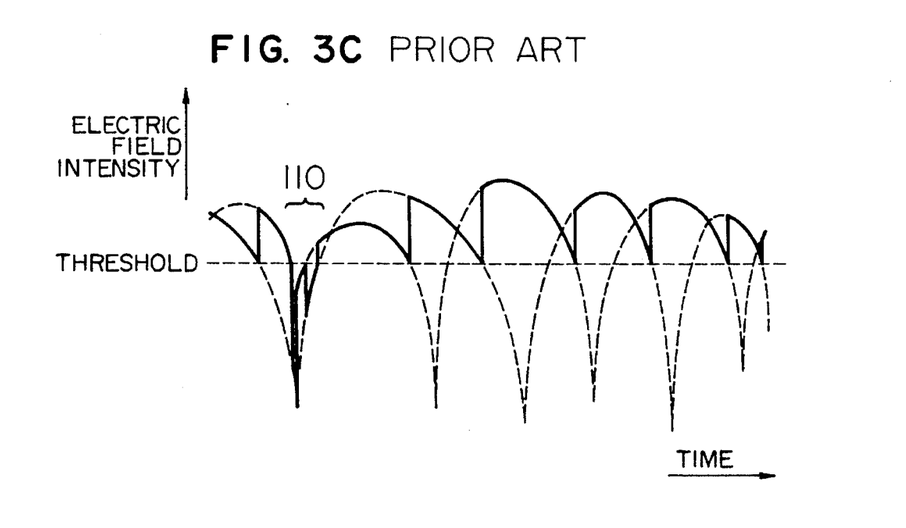

FIGS. 3A to 3C and 4A to 4C show waveforms for explaining the operation of the second example of the conventional diversity receiver of antenna-switching type. FIGS. 3A to 3C represent the case in which the receiving electric field intensity is low, and FIGS. 4A to 4C the case where the receiving electric field intensity is high. In FIGS. 3A to 3C and 4A to 4C, the threshold is at the same level. In FIG. 3A, numeral 90 designates a receiving electric field intensity of the antenna 10, and numeral 100 that of the antenna 20. The solid line in FIG. 3C represents the receiving electric field intensity of the antenna connected to the receiving section 30 through the antenna switch 70, and the dashed line that of the antenna not so connected.

Now, assuming that the antenna 10 is connected to the receiving section 30. In the event that the receiving electric field intensity undergoes a change as shown in FIG. 3A due to fading while receiving and the threshold decision circuit 80 decides that the receiving electric field intensity has decreased below a predetermined threshold level, then the antenna switch 70 is switched thereby to connect the antenna 20 to the receiving section 30.

To the extent that a sufficient distance is secured between the antennas 10 and 20, the correlation in the instantaneous value of the receiving electric field intensity is small between the antennas 10 and 20. When the receiving electric field intensity of one of the antennas is considerably low, the receiving electric field intensity of the other antenna is most likely to be higher. As a result, the antennas are switched sequentially as shown in FIG. 3B, and the electric field intensity at the receiving section 30 assumes the solid line as shown in FIG. 3C

Consequently, the probability is high that the antenna of a higher receiving electric field intensity is selected, resulting in producing a receiving output superior to that lacking the diversity.

Figure 4A:
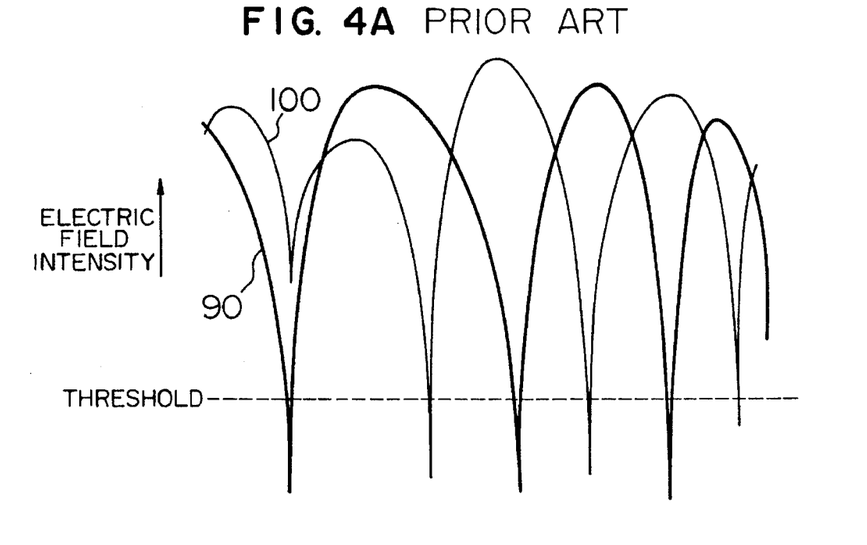
FIGS. 4A to 4C are diagrams for explaining a conventional diversity receiver of antenna-switching type.
Figure 4B:
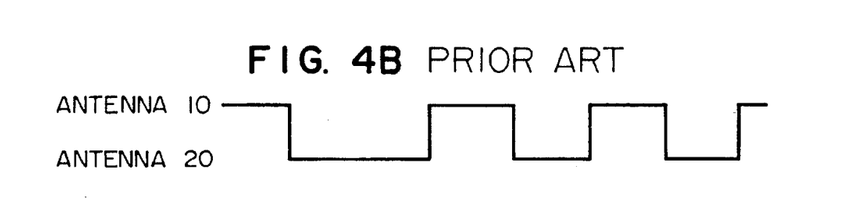
Figure 4C:
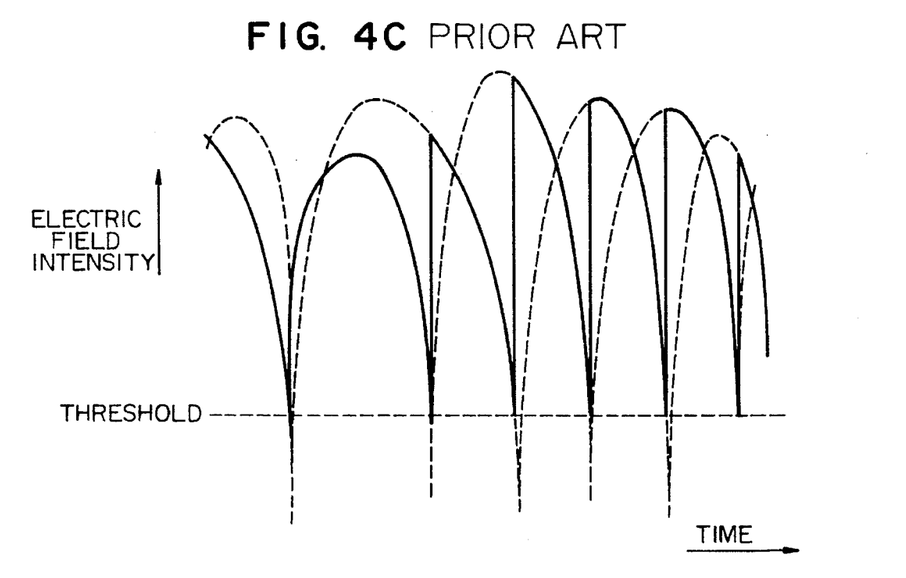

With the second example of the conventional diversity antenna of antenna-switching type, however, in the case where the receiving electric field intensity is high on the average as shown in FIG. 4A, the probability that the antenna with a higher instantaneous value of the receiving electric field intensity is decreased as shown in FIG. 4C (there are more cases in which the electric field intensity indicated by dotted line is larger than that indicated by solid line during a given time), thereby resulting in a decreased diversity gain.

In the event that the receiving electric field intensity is low on the average as shown in FIG. 3A, by contrast, both the receiving electric field intensities 90 and 100 are often lower than the antenna-switching threshold level. The antennas are switched with an increased frequency as during the period 110 shown in FIGS. 3A to 3C as the antenna with a receiving electric field intensity higher than the threshold is searched for. In this case, too, the probability decreases that the antenna with a higher instantaneous value of the receiving electric field intensity is connected, thereby leading to the problem of a reduced diversity gain. This is partly attributable to the fact that the threshold value for antenna-switching is fixed at a value.

Accordingly, a second embodiment of the invention further comprises a fading speed detector for detecting a fading speed, i.e.,a temporal change rate of an instantaneous receiving electric field intensity of a radio wave received by an antennas, a threshold memory for storing an antenna-switching threshold value corresponding to individual fading speeds detected by the fading speed detector, a threshold converter for producing an antenna-switching threshold value corresponding to the fading speed detected by the fading speed detector with reference to a threshold memory, and antenna-switching decision means for switching the antennas through an antenna switch when the instantaneous receiving electric field intensity detected by the receiving electric field intensity detector decreases below the antenna-switching threshold value produced from the threshold converter.

Figure 5:
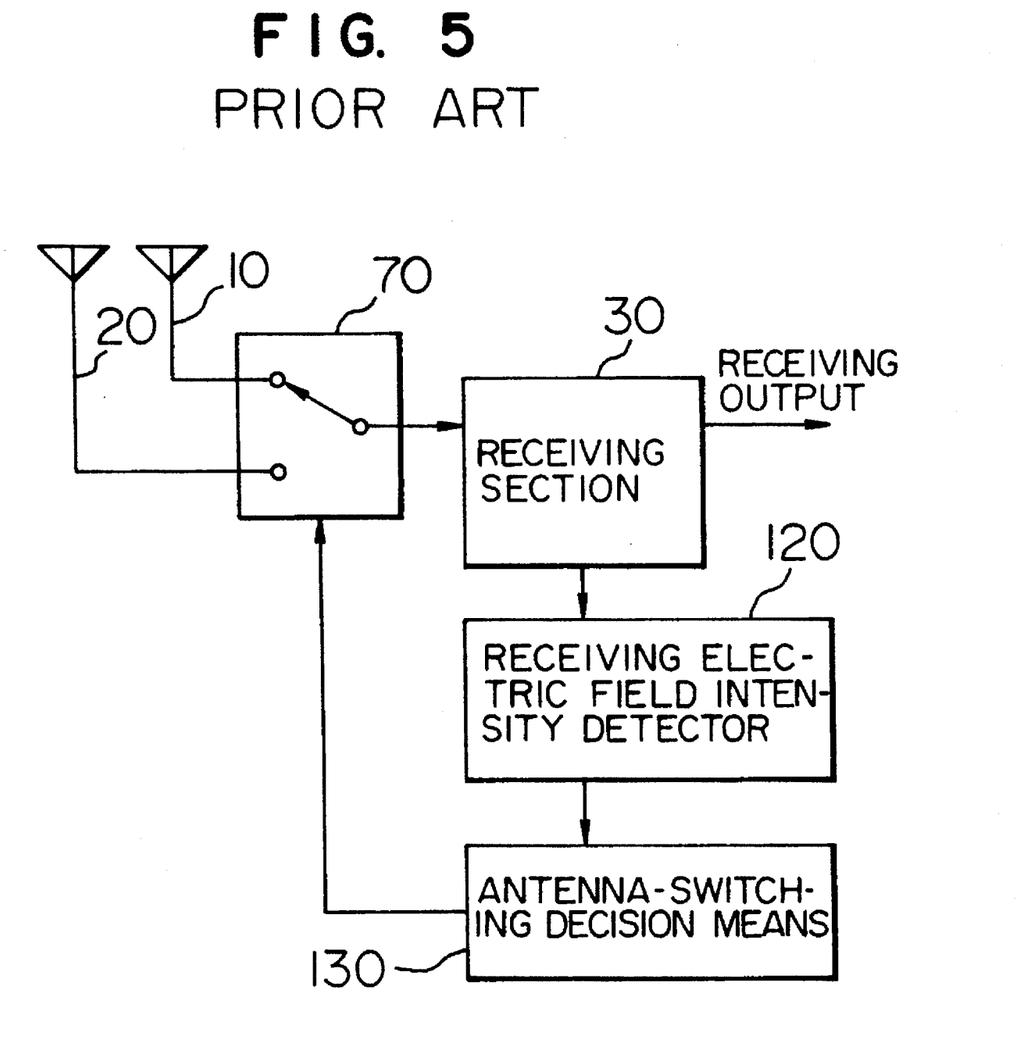
FIG. 5 is a diagram for explaining a conventional diversity receiver of antenna-switching type.

Now, explanation will be made about a third example of the conventional diversity receiver. FIG. 5 is a block diagram showing the third conventional diversity receiver. Numerals 10, 20 designate antennas for receiving radio waves, numeral 70 an antenna switch connected to the antennas 10 and 20 for selecting one of the antennas, numeral 30 a single receiving section for producing a receiving output from the radio wave received at the antenna selected by the antenna switch 70, numeral 120 a receiving electric field intensity detector for detecting an instantaneous receiving electric field intensity from the receiving output detected at the receiving section 30, and numeral 130 antenna-switching decision means for switching the presently-used antenna to the remaining antenna through the antenna switch 70 when the instantaneous receiving electric field intensity detected by the receiving electric field intensity detector 120 decreases below a predetermined antenna-switching threshold level.

Figure 6A:
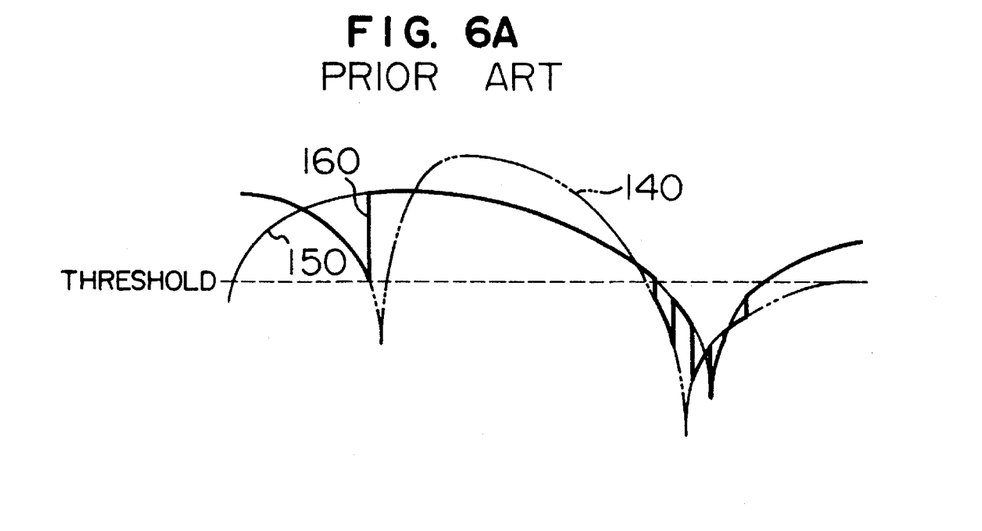
FIGS. 6A and 6B are diagrams showing an antenna-switching operation of a conventional diversity receiver against the continuous wave.

Explanation will be made about the operation of the third example of the conventional diversity receiver configured as above. FIG. 6A is a diagram showing the antenna-switching operation of the third example of the conventional diversity receiver against the continuous wave, and FIG. 6B a diagram showing the operation of the same diversity receiver against the burst wave. Numeral 140 designates a receiving electric field intensity curve representing the temporal change of the receiving electric field intensity for the antenna 10, numeral 150 a receiving electric field intensity curve representing the temporal change of the receiving electric field intensity for the antenna 20, and numeral 160 a receiving output intensity curve representing the temporal change of the receiving output intensity against the continuous wave obtained by the conventional diversity receiver.

Figure 6B:
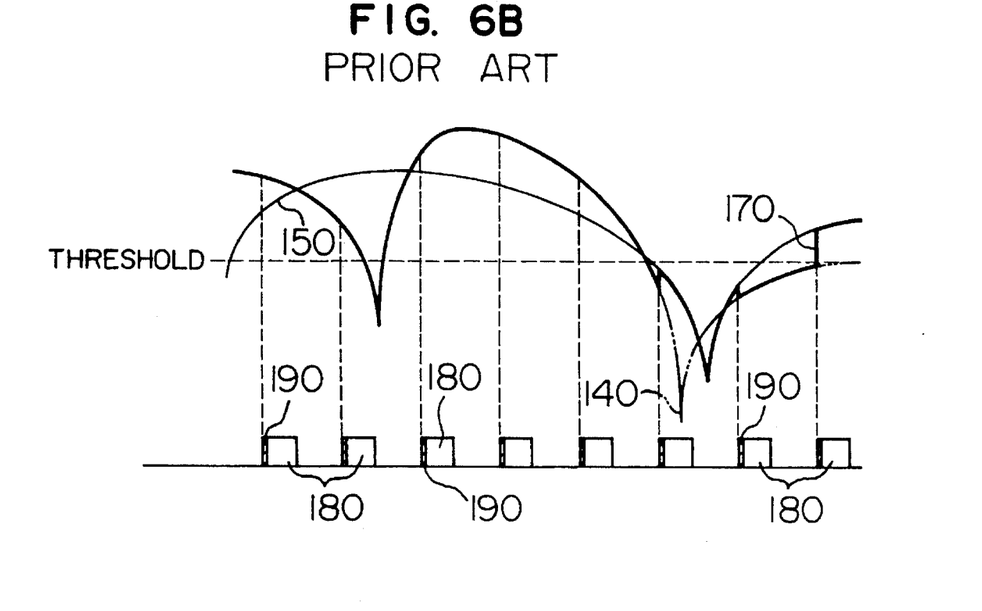

In FIG. 6B, numeral 170 designates a receiving output intensity curve representing the temporal change of the receiving output intensity against the burst wave obtained by the conventional diversity receiver, numeral 180 a discontinuous burst in time-division multiple access, time-division duplex operation, etc. and numeral 190 leading sections such as a start symbol or preamble of the burst 180 containing no information.

First, in the conventional diversity receiver, the instantaneous receiving electric field intensity at the antenna presently connected to the receiving section 30 through the antenna switch 70 is detected by the receiving electric field intensity detector 120. The instant the antenna-switching decision means 130 decides that the instantaneous receiving electric field intensity decreases below the predetermined antenna-switching threshold level, the antenna switch 70 switches from the antenna 10 to the antenna 20, for example, when the antenna connected to the receiving section 30 is the antenna 10. Since the antennas 10 and 20 are arranged in sufficiently spaced relation to each other, as seen from FIG. 6A, the correlation between the receiving electric field intensity curve 140 and the receiving electric field intensity curve 150 becomes smaller.

Consequently, in the case where one of the receiving electric field intensity curves is considerably low, the probability of the other receiving electric field intensity curve being higher is large. The result is a greater probability of the antenna of a higher receiving electric field intensity being selected by the antenna switch 70. It is therefore possible to obtain a receiving output superior to that of the receiver lacking such a function.

Further, an improvement of the diversity gain for antenna-switching type of the receiver is disclosed in JP-A-57-10542 (hereinafter referred to as No.A), JP-A-62-47222 (hereinafter referred to as No.B), etc. as a receiver with an antenna-switching threshold value adaptably changed in accordance with the value of the instantaneous receiving electric field intensity detected by the receiving electric field intensity detector 120.

In the conventional diversity receivers, the receiving output generally has a discontinuous phase and a switching noise is generated when switching the antennas. The leading section 190 of each burst 180 of the burst wave, as shown in FIG. 6A, occurring at the time of time-division multiple access or time-division duplex operation used for the digital portable telephone or second-generation cordless telephone, therefore, is used for detection of the instantaneous receiving electric field intensity by the receiving electric field intensity detector 120 of the receiving section 30. When the antenna-switching decision means 130 decides that the instantaneous receiving electric field intensity is smaller than the predetermined antenna-switching threshold level, the antenna switch 70 immediately switches from, say, the antenna 10 to the antenna 20 if the antenna 10 is currently connected to the receiving section 30, for example, during the time zone when the leading section 190 of the burst 180 is received or the time zone when the information is not contained such as the time zone between bursts 180. A receiving output superior to that of the receiver lacking such a function can thus be obtained.

As obvious from FIG. 6B, the instantaneous receiving electric field intensity is detected or the antennas are switched during the time zone of the leading section 190 of each burst 180 or between bursts 180. Therefore, in the case where the receiving electric field intensity in each burst 180 sharply decreases to less than the antenna-switching threshold level, the antennas fail to be switched.

In the configuration of the third conventional diversity receiver, the instantaneous electric field intensity is detected or the antennas are switched only in the leading section or the like of each burst, so that the temporal change rate of the instantaneous electric field intensity, i.e., the fading speed of the burst wave increases. As a result, with the increase in the change of the receiving electric field intensity in each burst, even when the average receiving electric field intensity of each burst is smaller than the predetermined antenna-switching threshold level, the antennas fail to be switched if the instantaneous receiving electric field intensity of the leading section or the like alone of each burst is larger than the antenna-switching threshold level. The diversity gain is thus reduced, thereby leading to the problem of a lower reliability.

In the case where the conventional diversity receiver is mounted on a mobile unit such as an automobile, the fading speed generally increases in proportion to the traveling speed of the mobile unit. The result is a reduced diversity gain, and the lack of general applicability is posed as a problem.

The diversity receivers disclosed in Nos.A and B, in which the antenna-switching threshold level is changed in accordance with the instantaneous receiving electric field intensity alone, on the other hand, similar problems of reduced diversity gain and lack of general applicability are encountered.

In view of this, a third embodiment of the invention is such that the fading speed detector described above includes a counter or the like for detecting the number of antenna-switching operations of the antenna switch and the fading speed of the radio wave received by the antenna is detected based on the antenna-switching frequency detected by the counter.

Further, a fourth embodiment of the invention comprises a traveling speed detector for detecting a traveling speed of a mobile unit, a fading speed detector for detecting a fading speed, i.e., a temporal change rate of the instantaneous receiving electric field intensity of the radio wave received by the antenna based on the traveling speed of the mobile unit, a threshold memory for storing the antenna-switching threshold level corresponding to each fading speed detected by the fading speed detector, a threshold converter for producing an antenna-switching threshold value corresponding to the fading speed detected by the fading speed detector with reference to the threshold memory, and antenna-switching decision means for switching the antennas through the antenna switch in the case where the instantaneous receiving electric field intensity detected by the receiving electric field intensity detector is lower than the antenna-switching threshold level produced from the threshold converter.

A diversity receiver according to the fourth embodiment of the invention is so configured that the threshold memory in the second or third embodiment is a nonvolatile memory or the like.

The burst wave is the one associated with the time-division multiple access or time-division duplex operation used for the digital portable telephone, the digital automobile telephone, the second-generation cordless telephone or the like. The fading speed detector is operated based on the traveling speed of the mobile unit carrying the diversity receiver or the antenna-switching frequency of the antenna switch. The threshold memory is a nonvolatile memory or the like.

Also, the antenna-switching frequency is calculated by the counter for detecting the number of antenna-switching operations, which is reset at regular time intervals to use the prevailing count or the reciprocal of the time required before a predetermined count is reached.

The traveling speed detector is a device using the output from the speedometer arranged on the mobile unit.

The nonvolatile memory or the like includes a ROM, a RAM backed up by a battery, a magnetic disk, a magnetic tape, a hard disk, a CD-ROM or a photoelectromagnetic disk.

The fading speed detector, the threshold memory, the threshold converter, etc. realized by a controller including the microcomputer simplifies the system configuration and is preferable from the viewpoint of productivity.

Further, the controller includes a microcomputer or the like arranged beforehand in the diversity receiver in order to control the whole of the diversity receiver. This is preferable from the viewpoint of reducing the number of parts and improving productivity, as well as for reducing the size and providing the general applicability to the diversity receiver.

The aforementioned configurations according to the second to fourth embodiments improve the diversity gain even when an increased fading speed aggravates the change in the receiving electric field intensity in each burst. Also, since a high diversity gain is obtainable in spite of an increased fading speed, the receiver can be mounted even on an automobile or the like vehicle traveling at high speed.

DESCRIPTION OF THE PREFERRED EMBODIMENTS

A diversity receiver of antenna-switching type according to the first embodiment of the invention will be explained with reference to the accompanying drawings. The first embodiment corresponds to the first or second conventional diversity receiver.

Figure 7:
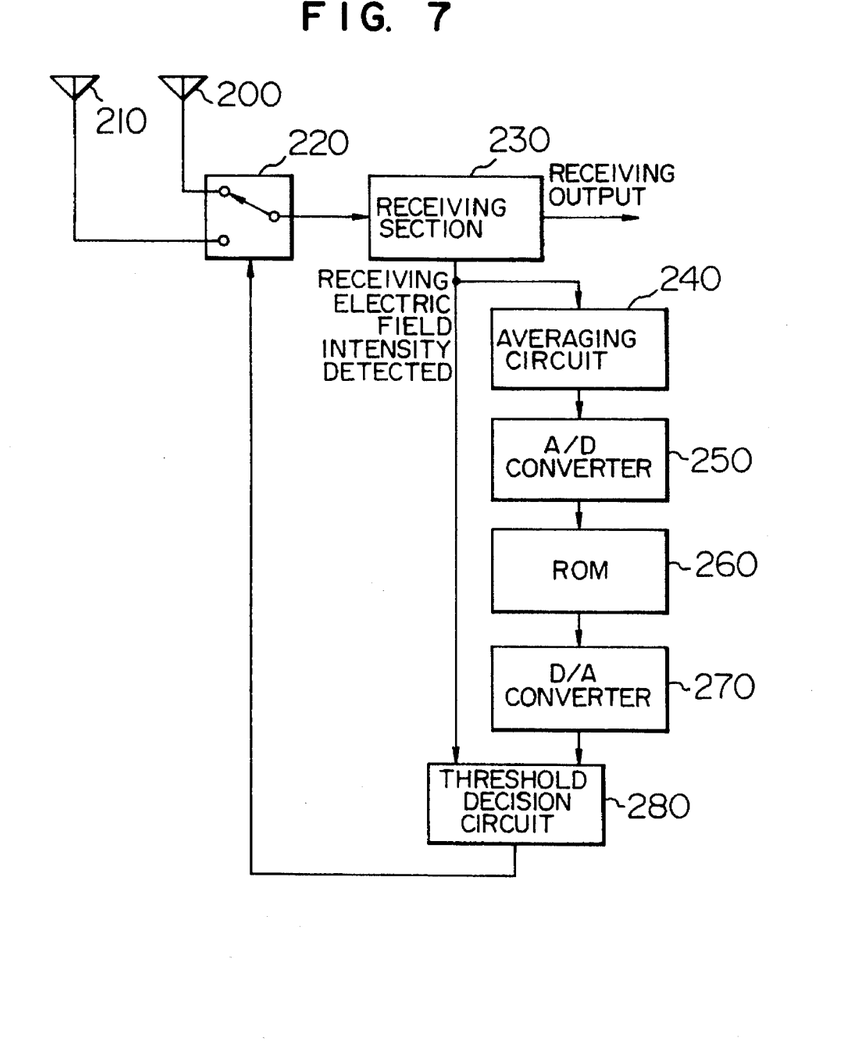
FIG. 7 is a block diagram showing the configuration of a diversity receiver according to a first embodiment of the present invention.

FIG. 7 is a block diagram showing the configuration of a diversity receiver of antenna-switching type according to the first embodiment. In FIG. 7, numerals 200, 210 designate antennas, numeral 220 an antenna switch for selecting the antenna 200 or 210, and numeral 230 a receiving section for receiving a desired radio wave through the antenna 200 or 210 connected by the antenna switch 220 and demodulating a receiving output. The receiving section 230 is capable of detecting an instantaneous value of a receiving electric field intensity.

Figure 8:
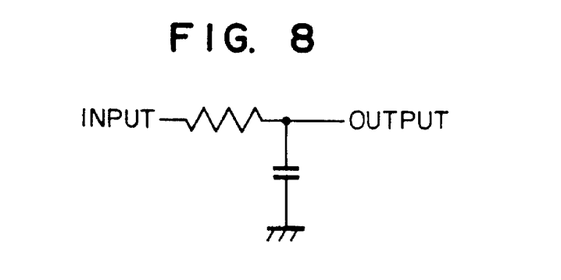
FIG. 8 is a diagram showing an integrating circuit as a specific example of an averaging circuit according to the first embodiment.

Numeral 240 designates an averaging circuit for producing a short-time average of the instantaneous value of the receiving electric field intensity at the receiving section 230. This averaging circuit may be configured of a simple integrating circuit, for example, as shown in FIG. 8. Numeral 250 designates an A/D converter for converting the output of the averaging circuit 240 into digital data, and numeral 260 a read-only memory (ROM) for storing the appropriate threshold value corresponding to the short-time average value of the receiving electric field intensity. This read-only memory makes up the converter included in the configuration of the invention. Numeral 270 designates a D/A converter for converting the output of the ROM 260 into an analog signal.

Numeral 280 designates a threshold decision circuit as a comparator included in the invention. This circuit 280 is so configured that in the case where the receiving electric field intensity decreases below the threshold level written in the ROM 260, the antenna switch 220 is controlled appropriately. Specifically, in the case where the antenna 200 is currently connected to the receiving section 230, connection is switched to the antenna 210, while if the antenna 210 is presently connected to the receiving section 230, the antenna 210 is switched to the antenna 200.

The operation of the diversity receiver of antenna-switching type according to the first embodiment configured as described above will be explained below.

Figure 9A:
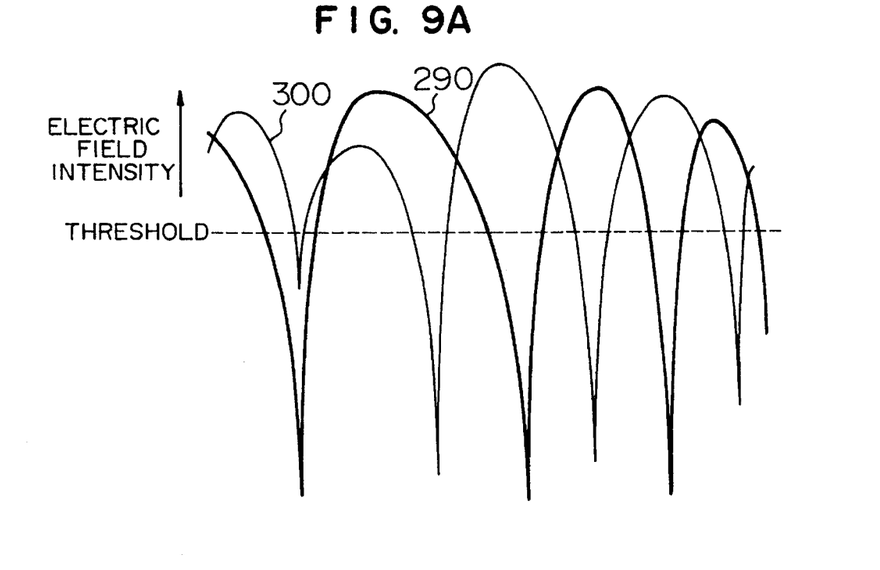
FIGS. 9A to 9C are diagrams for explaining the operation of the diversity receiver according to the first embodiment.
Figure 9B:
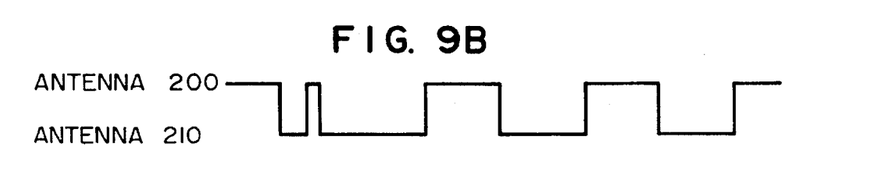
Figure 9C:
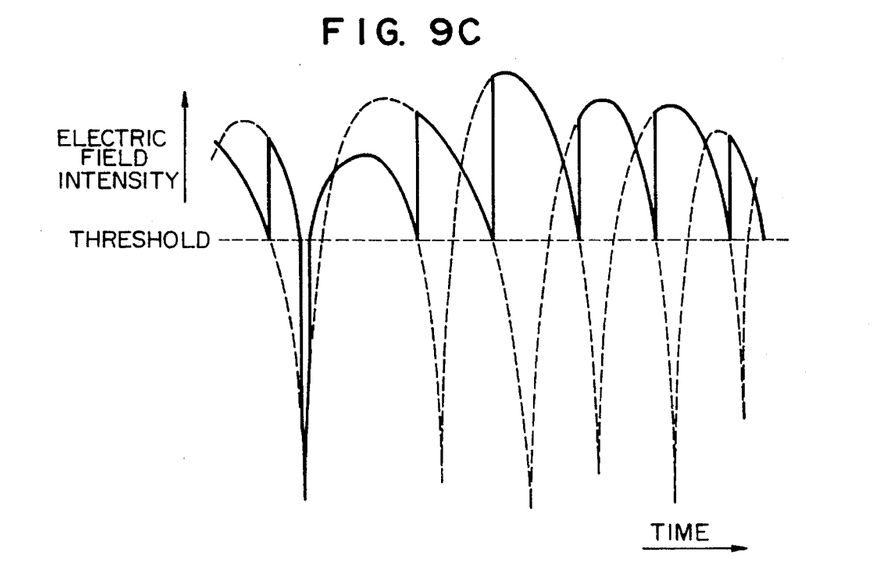

FIGS. 9A to 9C which show waveforms for explaining the operation concern the case in which the receiving electric field intensity is comparatively high. In FIG. 9A, numeral 290 designates a receiving electric field intensity at the antenna 200, and numeral 300 a receiving electric field intensity at the antenna 210. In FIG. 9C, the solid line represents the receiving electric field intensity at the antenna connected to the receiving section 230 through the antenna switch 220, and the dashed line the receiving electric field intensity at the antenna not connected to the receiving section 230.

Now, assume that the antenna 200 is connected to the receiving section 230 by the antenna switch 220. In the case where the receiving electric field intensity undergoes a change due to fading as shown in FIG. 9A during the receiving operation, the averaging circuit 240 produces a short-time average value of the instantaneous value of the receiving electric field intensity. More specifically, the integrating circuit shown in FIG. 8 having a time constant several times as long as the fading period involved produces an average value. This short-time average value is converted into digital data by the A/D converter 250 and is used to access the ROM 260. The ROM 260 has written therein a high threshold value when the short-time average value of the instantaneous value of the receiving electric field intensity is high, and vice versa. The ROM 260 produces a threshold value corresponding to the short-time average value applied thereto and applies the particular threshold value to the threshold decision circuit 280 through the D/A converter 270. In the threshold decision circuit 280, the instantaneous value of the receiving electric field intensity from the receiving section 230 is compared with the threshold value read from the ROM 260, i.e., the threshold value corresponding to the short-time average value. When the instantaneous value of the receiving electric field intensity decreases below the threshold level, the antenna switch 220 is switched to connect the antenna 210 to the receiving section 230.

Consequently, as shown in FIG. 9B, the antennas are sequentially switched, and the electric field intensity for the receiving section 230 assumes a solid line as shown in FIG. 9C. In other words, in the case where the receiving electric field intensity is high on the average, the threshold level for antenna-switching is relatively high. As a result, as clear from comparison between FIG. 9C and FIG. 4C of the prior art, the probability of the antenna with a higher receiving electric field intensity being selected becomes higher, resulting in a superior receiving output.

Figure 10:
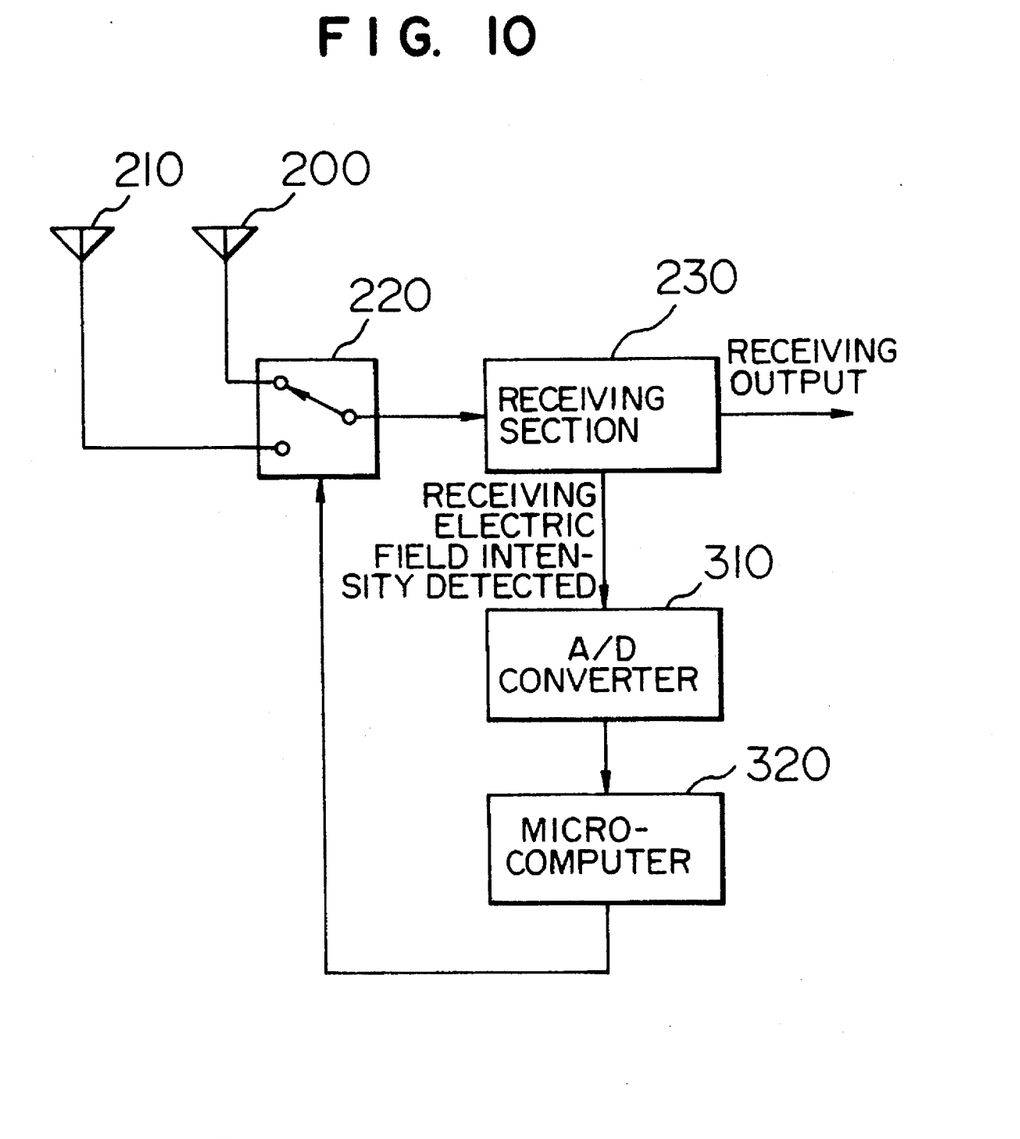
FIG. 10 is a block diagram showing the configuration of a diversity receiver according to the first embodiment.

As an alternative, the averaging circuit 240, the A/D converter 250, the ROM 260, the D/A converter 270 and the threshold decision circuit 280 may be replaced with a configuration using an A/D converter 310 and a microcomputer 320 as shown in FIG. 10. In FIG. 10, numerals 200 and 210 designate antennas, numeral 220 an antenna switch, and numeral 230 a receiving section, which are equivalent to those in FIG. 7 respectively. The A/D converter 310 is for converting the instantaneous value of the receiving electric field intensity obtained from the receiving section 230 into digital data. The microcomputer 320 calculates the short-time average value of the instantaneous value of the receiving electric field intensity input through the A/D converter 310, while at the same time determining a threshold value with reference to a built-in or an externally-connected ROM as in the aforementioned embodiment. The microcomputer 320 compares the threshold value with the instantaneous value of the receiving electric field intensity to control the antenna switch 220.

In this way, the present invention can be realized easily even with a configuration using a microcomputer. Since the microcomputer is built in a number of radio equipment today, the use thereof would further simplify the configuration and reduce the system size.

Now, a diversity receiver according to the second embodiment of the invention will be explained. The second to fourth embodiments described below correspond to the third example of the conventional diversity receiver.

Figure 11:
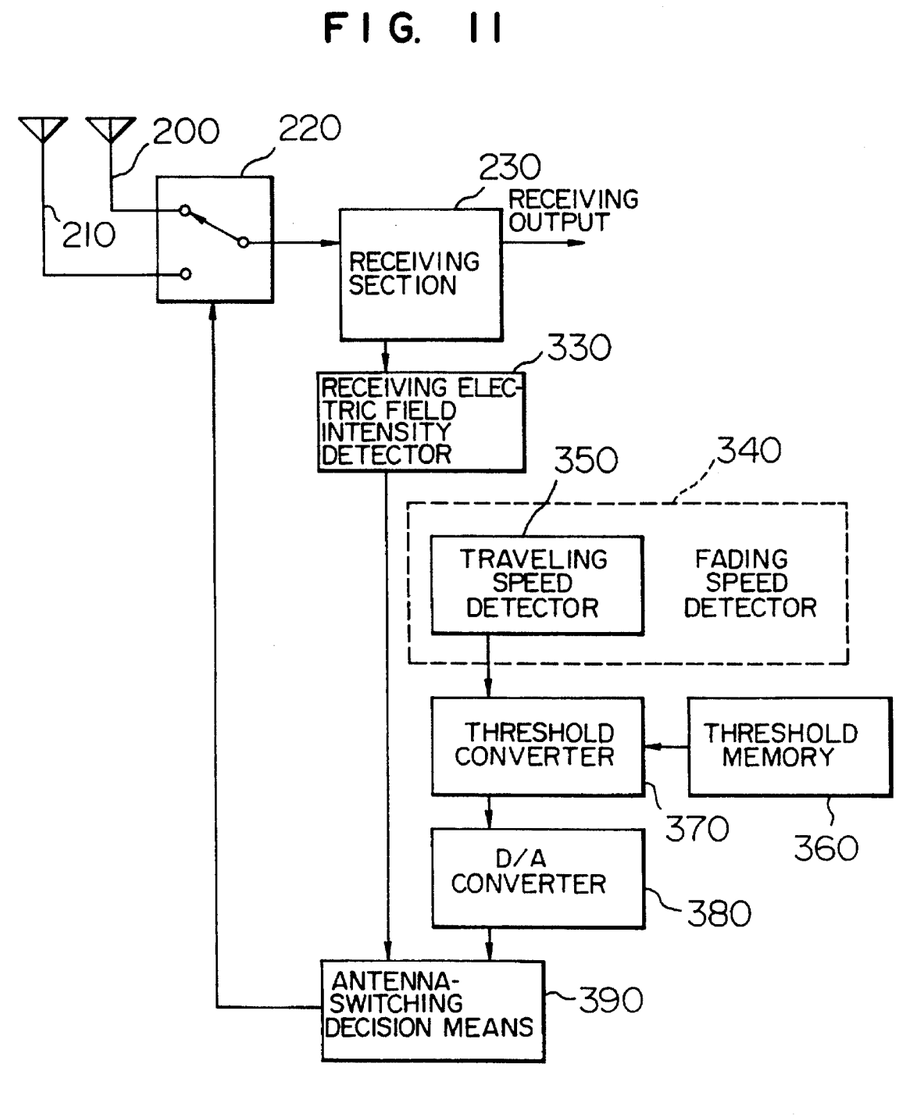
FIG. 11 is a block diagram showing a diversity receiver according to a second embodiment of the invention.

FIG. 11 is a block diagram showing the diversity receiver according to the second embodiment of the invention. Numerals 200 and 210 designate antennas, numeral 220 an antenna switch, and numeral 230 a receiving section for receiving a desired radio wave through the antenna 200 or 210 connected by the antenna switch 220 and demodulating and producing a receiving output. This receiving section 230 is capable of detecting an instantaneous value of a receiving electric field intensity. Numeral 330 designates a receiving electric field intensity detector for detecting the instantaneous receiving electric field intensity from the receiving output detected by the receiving section 230. Numeral 340 designates a fading speed detector for detecting a fading speed, i.e., a change rate of the receiving electric field intensity of the burst waves received by the antennas 200 and 210. Numeral 350 designates a traveling speed detector for detecting a traveling speed of a mobile unit or the like (not shown) carrying the diversity receiver (not shown). This traveling speed detector 350 makes up a fading speed detector 340 and is configured to detect the traveling speed of the mobile unit like the automobile (not shown) by the use of the speedometer (not shown). Numeral 360 designates a threshold memory making up a ROM or the like for storing a antenna-switching threshold value corresponding to each fading speed detected by the fading speed detector 340, numeral 370 a threshold converter for producing an antenna-switching threshold value corresponding to the fading speed of the burst wave detected by the fading speed detector 340 and received by the antenna with reference to the threshold memory 360, numeral 380 a D/A converter for converting the antenna-switching threshold value produced as a digital signal from the threshold converter 370 into an analog signal, and numeral 390 antenna-switching decision means for switching the antennas through the antenna switch 220 in the case where the instantaneous receiving electric field intensity produced from the receiving electric field intensity detector 330 decreases below the antenna-switching threshold level supplied as an analog signal from the D/A converter 380 at the portion of the leading section of each burst or between bursts.

Generally, the fading speed is proportional to the traveling speed of the mobile unit carrying the diversity receiver. When the traveling speed of the mobile unit detected by the traveling speed detector 350 increases, therefore, the fading speed detector 340 detects the increase in the traveling speed in terms of an increase in fading speed. Also, the threshold memory 360 stores a large antenna-switching threshold level for a large fading speed and a small switching-threshold level for a small fading speed, respectively.

Figure 12A:
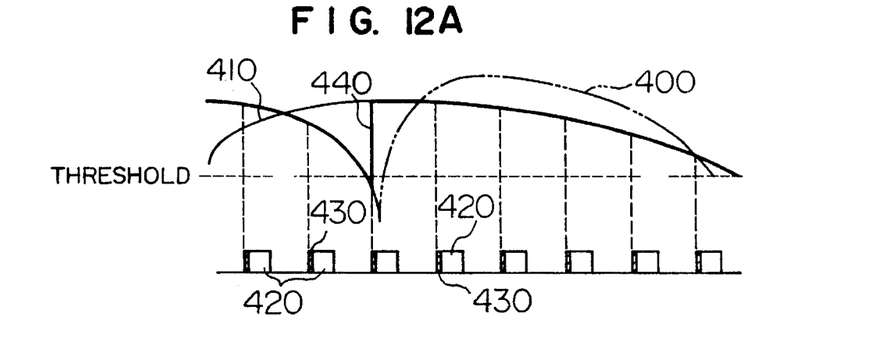
FIGS. 12A to 12C are diagrams showing the antenna-switching operation of the diversity receiver according to the second embodiment of the invention.
Figure 12B:
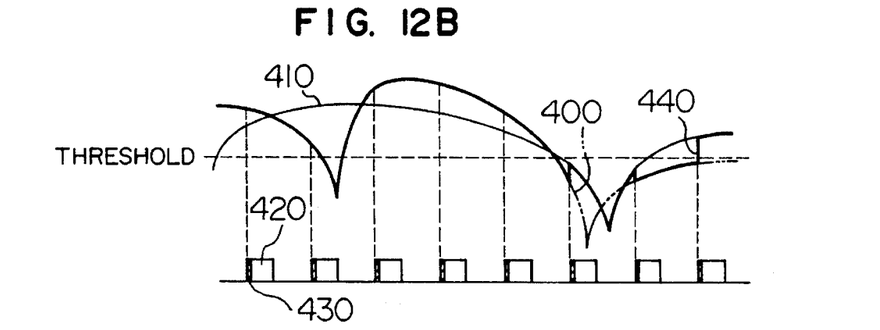
Figure 12C:
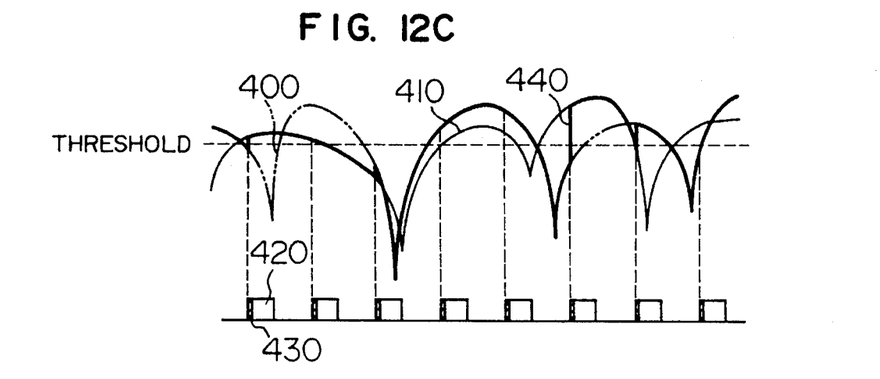

Explanation will be made about the operation of the diversity receiver according to the second embodiment configured as described above. FIGS. 12A to 12C show diagrams for explaining the antenna-switching operation of the diversity receiver according to the second embodiment of the invention. Numeral 400 designates a receiving electric field intensity curve representing the temporal change of the receiving electric field intensity for the antenna 200, numeral 410 a receiving electric field intensity curve representing the temporal change in the receiving electric field intensity for the antenna 210, numeral 420 individual discontinuous bursts due to the time-division multiple access, the time-division duplex operation or the like, and numeral 430 a leading section such as a start symbol, a preamble or the like of the burst 420 not containing the information. Numeral 440 designates a receiving output curve representing the temporal change in the receiving output intensity for the burst wave.

First, the receiving electric field intensity detector 330 detects the instantaneous receiving electric field intensity of a burst wave received through the antenna presently connected to the receiving section 230 by the antenna switch 220. On the other hand, the traveling speed detector 350 of the fading speed detector 340 detects the traveling speed of a mobile unit (not shown) like an automobile carrying the diversity receiver by the use of a speedometer (not shown) or the like.

As the next step, the fading speed detector 340 detects the fading speed of the burst wave received by the receiving section 230 based on the traveling speed detected by the traveling speed detector 350. When the traveling speed is small, a low fading speed is detected, and vice versa.

Then, with reference to the threshold memory 360, the threshold converter 370 produces an antenna-switching threshold level corresponding to the fading speed detected by the fading speed detector 340. In the process, in the case where the fading speed is low, a low antenna-switching threshold level is produced as shown in FIG. 12A, while when the fading speed is high, a high antenna-switching threshold level is produced as shown in FIG. 12C.

As the next step, the D/A converter 380 converts the antenna-switching threshold level applied as a digital signal from the threshold converter 370 into an analog signal and produces the particular analog signal.

Next, the antenna-switching decision means 390 switches the antennas through the antenna switch 220 in the case where the value of the instantaneous receiving electric field intensity applied from the receiving electric field intensity detector 330 is smaller than the antenna-switching threshold level applied from the D/A converter 380 in terms of analog signal at the leading section 430 of each burst 420 or between the bursts.

As seen from FIGS. 12A to 12C, the antennas are switched in substantially all cases when the receiving electric field intensity at the receiving section 230 is on the decrease. In such a case, the instantaneous receiving electric field intensity detected at the leading section 430 of each burst 420 is higher than the average electric field intensity in each burst 420, and the difference therebetween is proportional to the fading speed detected by the fading speed detector 340.

Assume that with the increase in the traveling speed of the mobile unit, the fading speed increases to such a degree that the threshold converter 370 sets a high switching-threshold level with reference to the threshold memory 360, thereby causing the antenna-switching decision means 390 to switch the antennas so that the receiving electric field intensity sharply decreases in each burst 420. Then, the antennas can be switched in advance thereby to improve the diversity gain as shown by the receiving output curve 440.

As described above, according to the embodiment under consideration, the fading speed detector 340 detects the fading speed and the threshold converter 370 changes the antenna-switching threshold level in accordance with the fading speed. In the case where the fading speed rises, therefore, the diversity gain is improved. Also, the diversity receiver can be mounted on a mobile unit like the automobile with an increased fading speed. Further, the traveling speed detector 350 for detecting the traveling speed of a mobile unit carrying the diversity receiver is included in the fading speed detector 340, so that the fading speed can be very easily detected by the use of a speedometer (not shown) arranged on the mobile unit. Furthermore, if the threshold memory 360 is made up of a nonvolatile memory like ROM, the antenna-switching threshold level can be changed continuously over a wide range.

Figure 13:
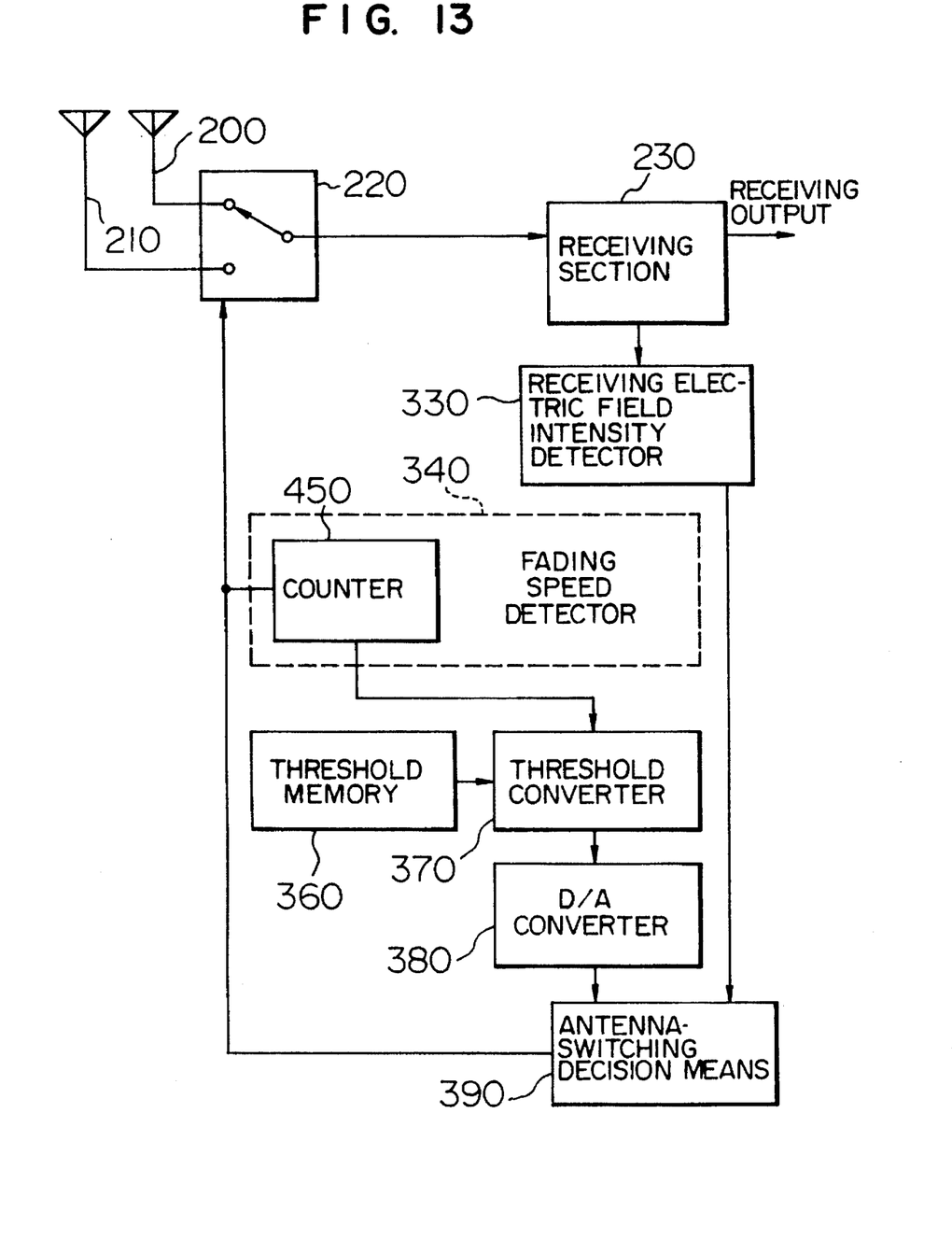
FIG. 13 is a block diagram showing a diversity receiver according to a third embodiment of the invention.

Now, a diversity receiver according to the third embodiment of the present invention will be explained with reference to the accompanying drawings. FIG. 13 is a block diagram showing the diversity receiver according to the third embodiment of the invention. Numerals 200 and 210 designate antennas, numeral 220 an antenna switch, numeral 230 a receiving section, numeral 330 a receiving electric field intensity detector, numeral 360 a threshold memory, numeral 370 a threshold converter, numeral 380 a D/A converter, and numeral 390 an antenna-switching decision means. These components are similar to the corresponding ones in the second embodiment, are denoted by the same reference numerals as in the second embodiment respectively, and will not be described any more.

Numeral 340 designates a fading speed detector for detecting the fading speed by the antenna-switching frequency of the antenna switch 220, and numeral 450 a counter making up the fading speed detector 340 for counting the number of antenna-switching operations at the antenna switch 220. This counter 450 is reset at predetermined time intervals and produces the prevailing value as an antenna-switching frequency. The fading speed detector 340 detects a low fading speed when the antenna-switching frequency produced from the counter 450 decreases and a high fading speed when the antenna-switching frequency increases.

The operation of the diversity receiver according to the third embodiment of the present invention configured as described above will be explained below.

First, as in the second embodiment, the receiving electric field intensity is detected by the receiving electric field intensity detector 330. At the same time, the counter 450 of the fading speed detector 340 counts the number of antenna-switching operations at the antenna switch 220. Thus the counter 450 is reset at regular intervals of time, and the prevailing value on the counter 450 is produced as an antenna-switching frequency.

As the next step, the fading speed of the burst wave received by the receiving section 230 is detected by the fading speed detector 340 on the basis of the antenna-switching frequency applied from the counter 450. The higher the antenna-switching frequency, the greater the considered variation in the instantaneous receiving electric field intensity of the burst wave. Therefore, the fading speed is detected as a small value when the antenna-switching frequency applied from the counter 450 decreases, and as a large value when the antenna-switching frequency increases.

In the next step, as in the second embodiment, the threshold converter 370 produces the antenna-switching threshold level corresponding to the fading speed.

The next step is for the antenna-switching decision means 390 to decide on switching the antennas as in the second embodiment.

As described above, according to the third embodiment, the antenna-switching frequency of the antenna switch 220 is detected by the counter 450, and the fading speed is detected based on the antenna-switching frequency by the fading speed detector 340, whereby the speed of the fading due to other than the movement of the diversity receiver is detected. At the same time, the local station providing a receiving end and a transmitting end can both be a mobile station, or as an alternative, the local station providing a receiving end can be a fixed station like a base station and a transmitting end a mobile station.

Figure 14:
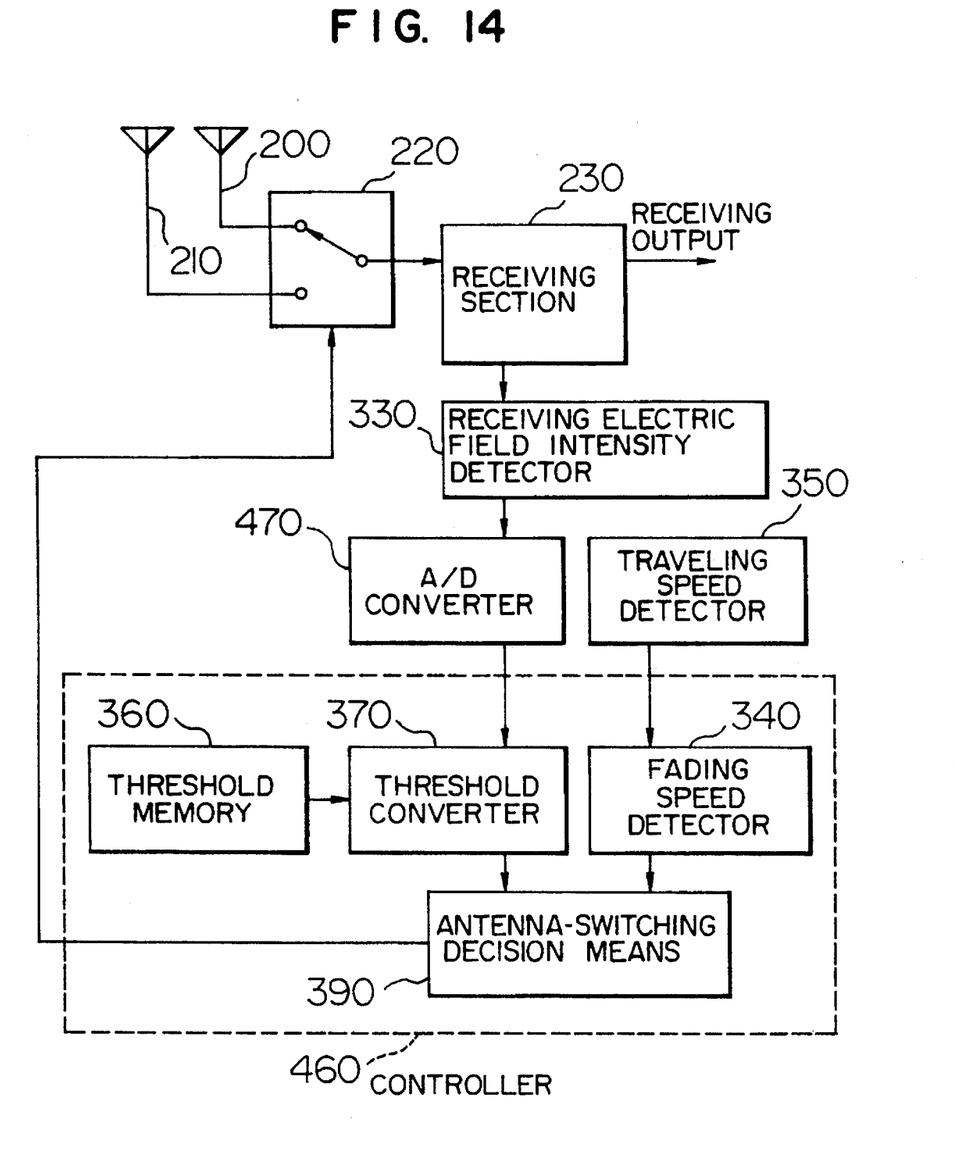
FIG. 14 is a block diagram showing a diversity receiver according to a fourth embodiment of the invention.

Next, a diversity receiver according to the fourth embodiment of the present invention will be explained with reference to the accompanying drawings. FIG. 14 is a block diagram showing the diversity receiver according to the fourth embodiment. Numerals 200, 210 designate antennas, numeral 220 an antenna switch, numeral 230 a receiving section, numeral 330 a receiving electric field intensity detector, numeral 340 a fading speed detector, numeral 350 a traveling speed detector, numeral 360 a threshold memory, numeral 370 a threshold converter, and numeral 390 an antenna-switching decision means. These component parts are similar to the corresponding ones in the second embodiment designated by the same reference numerals respectively and will not be described any more. Numeral 460 designates a controller for realizing the function of the fading speed detector 340 or the like and is comprised of a microcomputer or the like. Numeral 470 designates an A/D converter for converting the instantaneous electric field intensity of an analog signal supplied from the receiving electric field intensity detector 330 into a digital signal.

Explanation will now be made about the operation of the diversity receiver according to the fourth embodiment of the invention configured as described above. The diversity receiver according to the fourth embodiment of the invention comprises the fading speed detector 340 or the like the function of which is realized by the controller 460 including a microcomputer or the like. This embodiment is identical to the second embodiment except that in the embodiment under consideration the instantaneous receiving electric field intensity is applied to the controller 460 in digitized form.

As explained above, according to the fourth embodiment, the function of the fading speed detector 340 or the like is realized by the controller 460 including a microcomputer or the like, thereby simplifying the system configuration. Also, the control operation of the whole diversity receiver is realized by a microcomputer or the like (not shown) incorporated beforehand in the system, and in this way the number of required component parts is reduced while at the same time reducing the size of the diversity receiver.

Although the fading speed, which is detected according to this embodiment in a manner similar to that for the second embodiment, may instead be detected by a method similar to that for the third embodiment with equal effect.

As explained above, according to the present invention having a single receiving section, the configuration of small size and low cost is made possible. Further, in view of the fact that the threshold level of the comparator for switching the antennas is changeable in accordance with the short-time average of the instantaneous value of the receiving electric field intensity, a receiver is realized which has a high diversity gain ranging from a strong to a weak receiving electric field.

Furthermore, as another advantage of the present invention, the threshold level for switching the antennas increases with the fading speed of the burst wave received by the antennas. Even in the event that the fading speed increases to such an extent that the receiving electric field intensity within each burst changes very sharply, therefore, the diversity gain can be improved, thereby providing a reliable receiver with high portability. In addition, the diversity receiver according to the invention has the advantage of being mountable on a mobile unit like an automobile traveling at high speed.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

I claim:

1. A diversity receiver for receiving a burst wave, comprising:

at least two antennas;

an antenna switch for selecting one of the antennas and thus switching the antennas;

a receiving section for receiving a radio wave using the antenna selected by the antenna switch and producing a receiving output;

a receiving electric field intensity detector for detecting an instantaneous receiving electric field intensity at the receiving section;

a fading speed detector for detecting a fading speed which is a temporal change rate of the instantaneous receiving electric field intensity of the radio wave received by the antennas;

a threshold memory for storing an antenna-switching threshold level corresponding to each fading speed detected by the fading speed detector;

a threshold converter for producing the antenna-switching threshold level corresponding to the fading speed detected by the fading speed detector with reference to the threshold memory; and antenna-switching decision means for switching the antennas through the antenna switch in the case where the instantaneous receiving electric field intensity detected by the receiving electric field intensity detector decreases below the antenna-switching threshold level produced from the threshold converter.

2. A diversity receiver according to claim 1, wherein the threshold memory is a nonvolatile memory.

3. A diversity receiver according to claim 1, wherein the fading speed detector includes first means for detecting a number of antenna-switching operations at the antenna switch and second means for detecting the fading speed of the radio wave received through the antennas based on the antenna-switching frequency detected by the first means.

4. A diversity receiver according to claim 3, wherein the threshold memory is a nonvolatile memory.

5. A diversity receiver according to claim 3, the first means is a counter.

6. A diversity receiver mounted on a mobile unit for receiving a burst wave, comprising:

at lest two antennas;

an antenna switch for switching the antennas by selecting one of the antennas;

a receiving section for receiving a radio wave using the antenna selected by the antenna switch and producing a receiving output;

a receiving electric field intensity detector for detecting an instantaneous receiving electric field intensity at the receiving section;

a fading speed detector including a traveling speed detector for detecting a traveling speed of the mobile unit and detecting a fading speed, that is a temporal change rate of the instantaneous receiving electric field intensity of the radio wave received by the antenna, on the basis of the traveling speed of the mobile unit;

a threshold memory for storing an antenna-switching threshold level corresponding to each fading speed detected by the fading speed detector;

a threshold converter for producing the antenna-switching threshold level corresponding to the fading speed detected by the fading speed detector with reference to the threshold memory; and antenna-switching decision means for switching the antennas through the antenna switch in the case where the instantaneous receiving electric field intensity detected by the receiving electric field intensity detector decreases below the antenna-switching threshold level produced from the threshold converter.

7. A diversity receiver according to claim 6, wherein the threshold memory is a nonvolatile memory.

* * * * *